April 14, 1964
J. G. BRYANT
3,129,031
SELF RELEASING SLING
Filed April 12, 1962
2 Sheets-Sheet 1
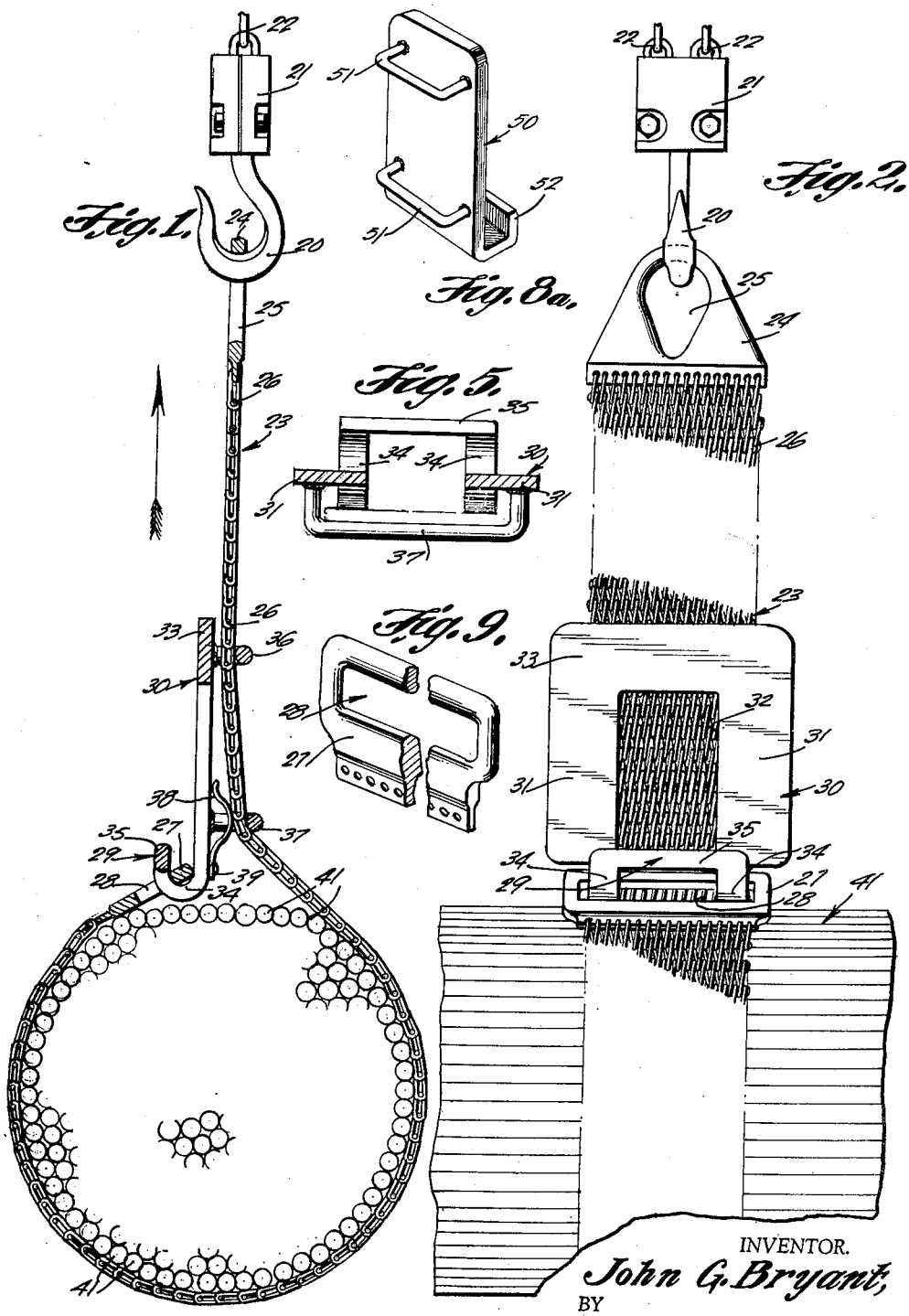
INVENTOR.
John G. Bryant,
BY
Victor J. Evans & Co.
Attorneys

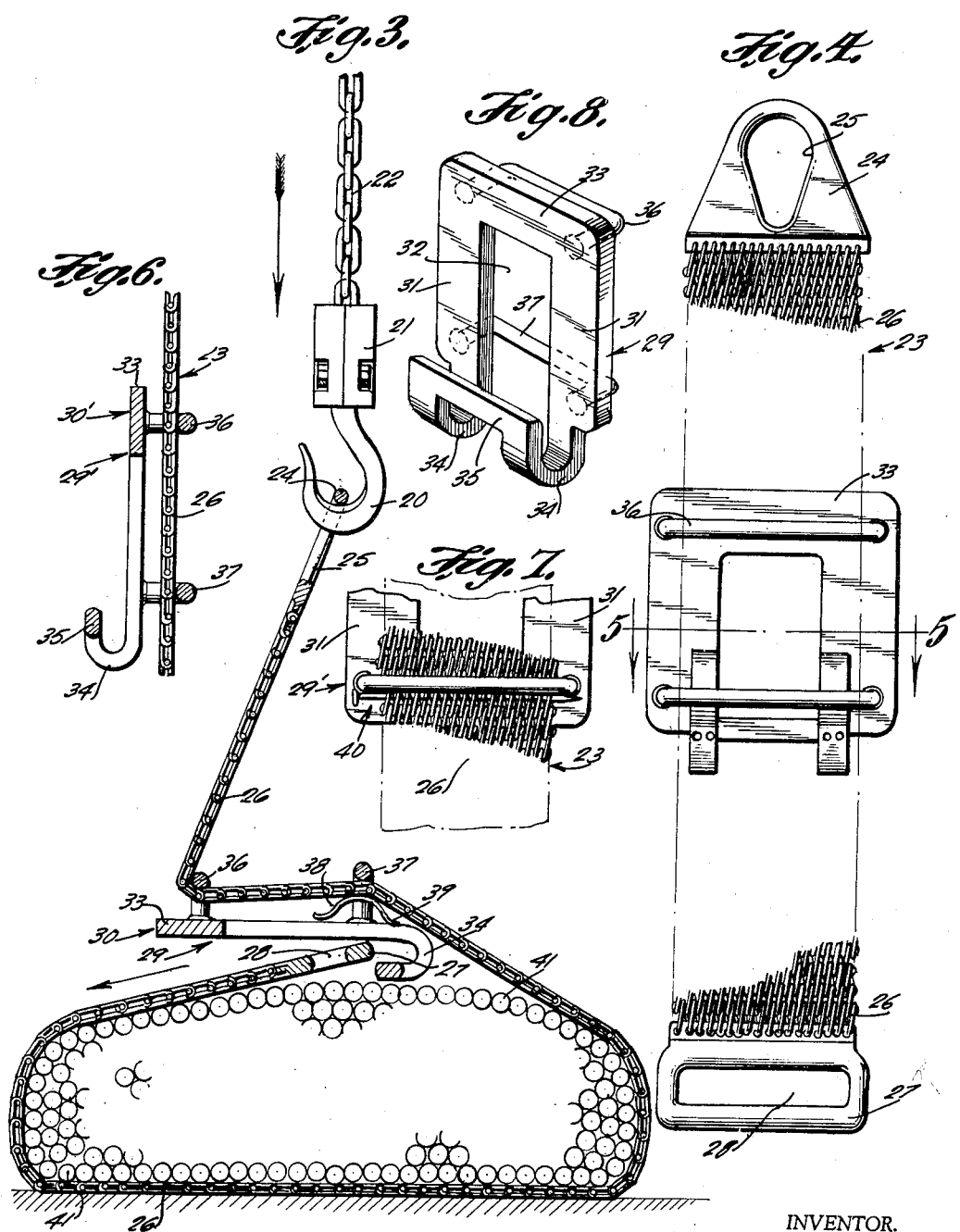

United States Patent Office 3,129,031
Patented Apr. 14, 1964

3,129,031
SELF RELEASING SLING
John G. Bryant, Radnor, Pa., assignor to The Cambridge Wire Cloth Company, a corporation of Maryland
Filed Apr. 12, 1962, Ser. No. 186,974
1 Claim. (Cl. 294—75)

The present invention relates to a sling, and more particularly to a self-releasing choker hook for a sling.

An object of the present invention is to provide a self releasing choker hook for a sling such as a wire cloth sling, fabric sling, manila rope sling, wire rope sling, chain sling or the like, and wherein the present invention provides a means for automatically releasing the choke end of a sling that is wrapped around a load.

Another object of the present invention is to provide a self releasing choker hook which is constructed so that the choker hook will be held in upright position when the sling is lifting the load, and wherein when the load is lowered and when tension in the sling is removed, the choker end of the sling will be automatically released.

A still further object of the present invention is to provide a self releasing choker hook which is economical to manufacture and safe to use and wherein the self releasing choker hook can be used speedily and with precision when handling various types of loads, and wherein other objects of the present invention are to provide a self releasing choker hook which is rugged in structure and efficient in operation.

To the accomplishment of the foregoing and such other objects as may hereinafter appear, this invention consists in the construction, combination and arrangement of parts hereinafter described and then sought to be defined in the appended claim, reference being had to the accompanying drawings forming a part thereof, and which show, merely for the purpose of illustrative disclosures, an embodiment of the invention, it being expressly understood, however, that various changes may be made in the practice within the scope of the claim now digressing from the present invention.

In the drawings:

FIGURE 1 is a side elevational view illustrating the self releasing choker hook of the present invention and illustrating the position of the parts when a load is being lifted, and with parts broken away and in section.

FIGURE 2 is an elevational view taken at right angles to the view shown in FIGURE 1.

FIGURE 3 is a view similar to FIGURE 1 but showing the position of the parts when the device is moving downwardly and illustrating the manner of releasing the choker hook.

FIGURE 4 is an elevational view of the sling per se.

FIGURE 5 is a sectional view taken on the line 5—5 of FIGURE 4.

FIGURE 6 is a fragmentary sectional view illustrating a modification.

FIGURE 7 is a view taken at right angles to the view shown in FIGURE 6.

FIGURE 8 is a perspective view illustrating the modification of FIGURES 6 and 7.

FIGURE 8a is a perspective view of a further modification.

FIGURE 9 is a perspective view of an end member, with parts broken away and in section.

Referring in detail to the drawings, and more particularly to FIGURES 1 through 5 of the drawings, the numeral 20 indicates a hook which is adapted to be connected to a chain or the like as indicated by the numeral 22, as for example by means of a member or element 21, FIGURE 1, and the chain 22 may be connected to a suitable overhead lift, hoist or other lifting mechanism.

As shown in the drawings, there is provided a sling which is indicated generally by the numeral 23, and the sling 23 has an end plate 24 on an end thereof, and the end plate 24 is provided with an opening 25 for engagement by the hook 20, FIGURES 1 and 2. The sling 23 further includes an elongated flexible body portion 26 which may be of a woven wire construction, and an end member 27 is connected to the opposite end of the body portion 26 from the end plate 24. The end member 27 has an opening 28 which defines or provides an eye 28 for a purpose to be later described.

According to the present invention there is provided a self releasing choker hook which is indicated by the numeral 29, and the choker 29 comprises a support member 30, and as shown in the drawings the support member 30 includes a pair of spaced parallel legs 31 which have a space 32 therebetween, and the legs 31 are joined at one end by straight portions 33. The other ends of the legs 31 terminate in curved or arcuate fingers or lugs 34 for selectively engaging the eye 28 of the end member 27, as for example as shown in FIGURE 1, and the fingers 34 are interconnected or joined together by a crosspiece 35.

The numerals 36 and 37 designate each of a pair of spaced parallel U-shaped eye formations or guide members, and the guide members 36 and 37 are secured as by welding to the support member 30, and a portion of the sling extends through the guide members 36 and 37 as for example as shown in FIGURE 1. A pair of spaced apart spring members 38 are affixed as at 39 to the support member 30, for a purpose to be later described.

Attention is directed to FIGURES 6, 7 and 8 of the drawings, wherein there is illustrated a modified self releasing choker hook that is indicated generally by the numeral 29', and the choker 29' includes a support member 30' which differs from the previously described support member 30 in that the support member 30' does not utilize springs such as the springs 38. Instead of using springs such as the springs 38, a stop pin 40 is adapted to be extended through a section of the body portion 26.

In FIGURES 1, 2 and 3, the numeral 41 indicates the load which is adapted to be handled by a sling such as the sling 23.

From the foregoing, it is apparent that there has been provided a self releasing choker hook, and in use with the parts arranged as shown in the drawings, it will be seen that when a load such as the load 41 is being raised or lifted as shown in FIGURE 1, the sling 23 is adapted to have its body portion 26 arranged in surrounding relation with respect to the load 41, and the choker 29 maintains the sling in proper holding position on the load 41. The load 41 may be of any type of material which is to be raised, lowered or otherwise moved or handled, and for example the load 41 may consist of a plurality of pipes, rods, bars or the like. When the load 41 is being raised as shown in FIGURE 1, it is to be noted that the eye 28 is engaged by the lugs or hooks 34 of the support member 30.

When the load 41 is lowered, the choker 29 is constructed so that it automatically releases and FIGURE 3 shows the action of the choker 29 releasing when the load 41 is lowered. The chain 22 is adapted to be actuated or operated by any suitable mechanism, as for example the chain 22 may be raised and lowered or otherwise moved by an overhead lift, hoist or the like, and the chain 22 has the hook 20 connected thereto as for example by means of the member 21. As shown in FIGURE 3, when the load 41 is lowered the lugs 34 automatically separate from the eye 28 of the end member 27.

Instead of using the springs 38, a pin 40 is adapted to be used as shown in FIGURES 6, 7 and 8, and the pin 40 is adapted to be extended through suitable loops or links of the body portion 26 just below and contiguous to the guide member 37, and the pin 40 will help hold the body portion 26 stationary relative to the guide members 36 and 37 when the load is lowered.

It will be seen that the sling 23 is adapted to have its end plate 24 arranged so that the opening 25 of the end plate 24 is engaged by the hook 20, and when a load such as the load 41 is being raised or lifted, as shown in FIGURES 1 and 2, the end member 27 has its eye 28 engaging the lugs 34 whereby the sling can be used for effectively and efficiently raising and moving the load to the desired location as desired or required.

The parts can be made or constructed of any suitable material and in different shapes or sizes.

The self releasing choker 29 of the present invention is especially suitable for use with woven wire slings, and wherein a highly flexible and safe and stable and strong and gentle device is provided which is capable of many different uses and wherein the device of the present invention is fast and easy to rig or use. The choker 29 is constructed so that a load will be held gently yet safely, and different sizes and shapes of loads can be handled as desired or required. The choker 29 will cut unhitching time since it automatically unhitches or releases when the load is lowered as shown in FIGURE 3. Special attachments can be used in conjunction with the sling and choker, and for example buckle type fasteners, hook or eye type handles, built-in pallets and the like can be used or provided wherever the same is deemed advisable or necessary.

It will therefore be seen that according to the present invention there has been provided a self releasing choker hook, and the primary purpose of the self releasing choker hook is to release automatically the choke end of a sling that is wrapped around a load.

In operation or use, tension on the sling holds the choker hook in upright position holding the end of the sling in the hook portion of the self releasing choker when the sling is lifting the load as for example as shown in FIGURE 1. When the load is lowered, as for example as shown in FIGURE 3, and when the tension in the sling which is caused by the weight of the load is removed, the lever action or weight causes the hook portion 34 to turn which causes the eye 28 of the sling to fall out of the hook portion 34, making it possible to release the choker end of the sling automatically.

The choker hook used on any relatively stiff or round body sling, such as a wire rope sling, is made by having the hook portion turn on the saddle portion of the hook that slides on the body of the sling so that the stiffness of the sling material will not restrict the releasing action. The use of the hook on round bodied slings would normally be such that the self releasing hook will stand upright when tension is off and in order to make it possible for the self releasing hook to properly function.

It is to be noted that if for any reason there is a tendency to restrict the turning of the self releasing choker hook in its releasing action, then it is very easy to increase the load by having the weight from the upper portion of the same lay over a sufficient amount to increase the force to cause the releasing action. Additional weight can be brought into play by using the weight of the crane or hoist block and hook 20 on the end of the lever arm.

The self releasing choker hook of the present invention can be used on wire cloth slings, different types of fabric slings, manila rope slings, wire rope slings, chain slings and the like.

The springs 38 serve to establish or maintain a constant yielding and self-adjusting tension against the body portion 26 to fix that portion of the body 26 as to loop size for subsequent loads of the same dimension.

Attention is now directed to FIGURE 8a of the drawings wherein there is illustrated a support member which is adapted to form part of a self releasing choker hook for a sling, and wherein the support member is indicated generally by the numeral 50 and it will be noted that the support member 50 has a solid construction and thus does not have a space such as the space 32 shown in the support member of FIGURE 8. The support member 50 has at least one guide member 51 suitably affixed thereto or formed integral therewith, and a portion of the sling is adapted to extend through the guide member or guide members 51. The support member 50 has a hook portion 52 thereon for selectively engaging an eye on the sling in the same manner as described previously.

Although the invention herein described is fully capable of achieving the objects and providing the advantages hereinbefore mentioned, it is to be understood that it is merely illustrative of the presently preferred embodiment of the invention and that the invention is not to be limited to the details of construction herein described, other than as defined in the appended claim.

What is claimed is:

The combination with a flexible sling including an end plate on one of the ends of said sling and an end member on the other of the ends of said sling, said end plate having an opening for receiving a hoist hook and said end member having an eye, of a choker comprising an upright support member, an upwardly facing hook on the lower end of said support member on one face of latter, and a pair of eye formations on the other face of said support member, one of said eye formations being spaced inwardly of the upper end of said support member and the other of said eye formations being spaced inwardly of the lower end of said support member, said eye formations being in registry with each other and slidably receiving therethrough a portion of said sling intermediate the ends thereof, said support member hook being removably received in the eye of said end member, the length of said support member relative to the depth of said support member hook being such that when said support member hook is received in said end member with the sling encompassing a load and a hoist hook in lifting engagement with said sling end plate, the execution of lowering of said load to a supporting surface and slackening the tension on said sling end plate results in the movement by the force of gravity of said support member from the upright position to a horizontal position freeing said support member hook from said sling end member.

References Cited in the file of this patent

UNITED STATES PATENTS

| | | |
|---|---|---|
| 722,721 | Lamb | Mar. 17, 1903 |
| 2,187,440 | Adolphe | Jan. 16, 1940 |
| 2,385,338 | Allerton | Sept. 25, 1945 |
| 2,867,026 | Gale | Jan. 6, 1959 |
| 2,903,292 | Himel | Sept. 8, 1959 |

FOREIGN PATENTS

| | | |
|---|---|---|
| 151,663 | Sweden | 1955 |

OTHER REFERENCES

"The Gripper Sling," Cambridge Wire Cloth Co. of Cambridge, Maryland, July 1, 1957, first 9 pages.